(12) United States Patent
Kose et al.

(10) Patent No.: US 10,691,038 B2
(45) Date of Patent: Jun. 23, 2020

(54) CONDUCTIVE ROLLER FOR ELECTROPHOTOGRAPHIC EQUIPMENT

(71) Applicant: Sumitomo Riko Company Limited, Aichi (JP)

(72) Inventors: Takahisa Kose, Aichi (JP); Shigeki Kanda, Aichi (JP); Yasuyuki Hayasaki, Aichi (JP); Hiroshi Ukai, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 0 days.

(21) Appl. No.: 16/677,618

(22) Filed: Nov. 7, 2019

(65) Prior Publication Data
US 2020/0073274 A1  Mar. 5, 2020

Related U.S. Application Data

(63) Continuation of application No. PCT/JP2018/031881, filed on Aug. 29, 2018.

(30) Foreign Application Priority Data

Dec. 26, 2017  (JP) .................................. 2017-248643

(51) Int. Cl.
*G03G 15/02* (2006.01)
*B32B 1/08* (2006.01)
(Continued)

(52) U.S. Cl.
CPC .......... *G03G 15/0233* (2013.01); *B32B 1/08* (2013.01); *B32B 7/12* (2013.01); *B32B 15/06* (2013.01);
(Continued)

(58) Field of Classification Search
CPC .............. G03G 15/02; G03G 15/0216; G03G 15/0233; G03G 15/08; G03G 15/0818;
(Continued)

(56) References Cited

U.S. PATENT DOCUMENTS 6,283,903 B1 * 9/2001 Onuki ................ G03G 15/0233
492/53
7,288,058 B2 * 10/2007 Kaji ................... G03G 15/0233
29/895.21
(Continued)

FOREIGN PATENT DOCUMENTS

JP          4662542          3/2011

*Primary Examiner* — Hoan H Tran
(74) *Attorney, Agent, or Firm* — JCIPRNET

(57) ABSTRACT

There is provided a conductive roller for electrophotographic equipment in which a shaft made of core metal has excellent rust resistance. The conductive roller includes a shaft made of core metal, a protective layer formed on the outer periphery of the shaft, and a conductive rubber elastic layer formed on the outer periphery of the protective layer. In a conductive roller for electrophotographic equipment, the conductive rubber elastic layer contains a rubber containing halogen atoms, and the protective layer is formed of a crosslinked material of a composition containing a material obtained by melting and mixing the following components (a) to (c):
(a) a polyfunctional maleimide compound having two or more maleimide groups;
(b) a benzoxazine compound; and
(c) an epoxy resin.

9 Claims, 2 Drawing Sheets

Figure 1:
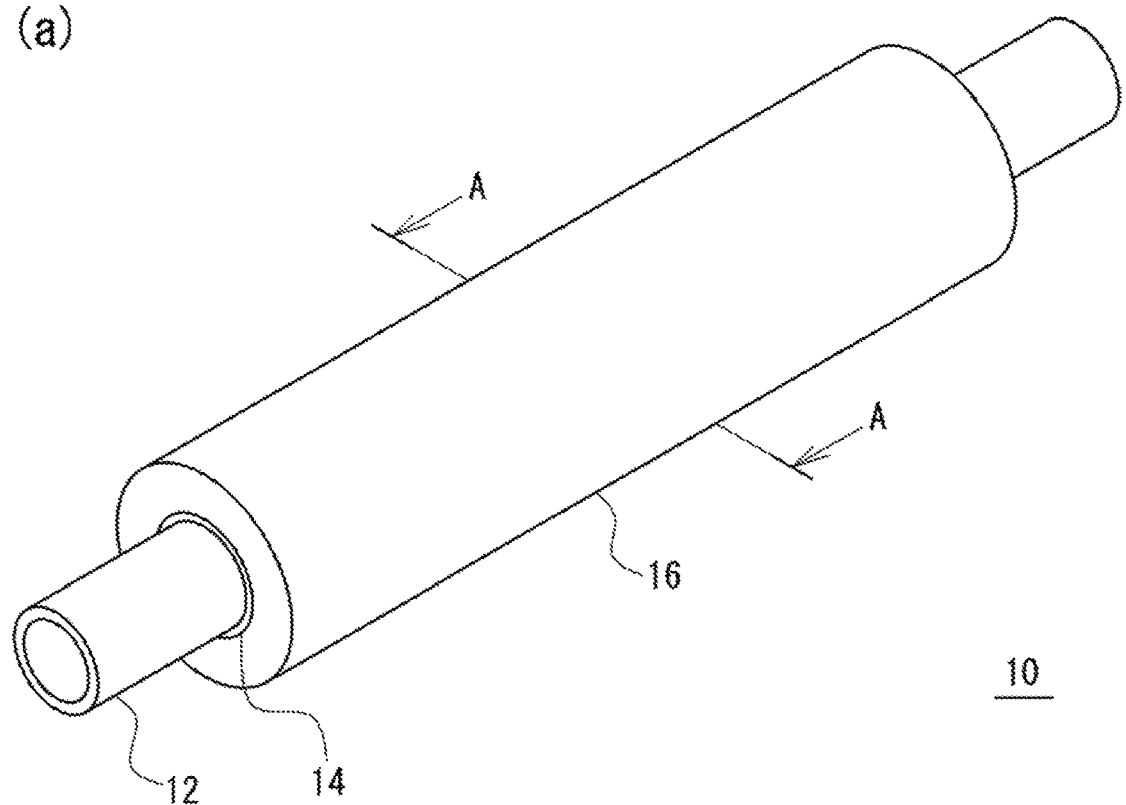
Figure 1:
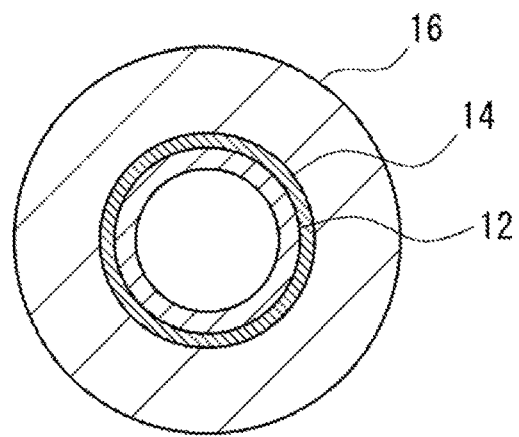

(51) Int. Cl.
*B32B 7/12* (2006.01)
*B32B 15/06* (2006.01)
*B32B 15/092* (2006.01)
*G03G 15/08* (2006.01)
*G03G 15/16* (2006.01)

(52) U.S. Cl.
CPC ....... *B32B 15/092* (2013.01); *G03G 15/0818* (2013.01); *G03G 15/1685* (2013.01); *B32B 2264/102* (2013.01); *B32B 2307/202* (2013.01)

(58) Field of Classification Search
CPC .. G03G 15/065; G03G 15/16; G03G 15/1685; G03G 2215/0861; G03G 2215/1614; B32B 1/08; B32B 7/12; B32B 15/16; B32B 15/092
USPC ....... 399/130, 168, 174, 176, 252, 265, 272, 399/279, 281, 310, 312
See application file for complete search history.

(56) References Cited

U.S. PATENT DOCUMENTS

| | | | | |
|---|---|---|---|---|
| 7,680,439 B2* | 3/2010 | Elbert | ................ | G03G 15/0208 |
| | | | | 399/176 |
| 8,725,014 B2* | 5/2014 | Hotomi | ............. | G03G 15/0266 |
| | | | | 399/43 |
| 9,785,094 B2* | 10/2017 | Takino | ............... | G03G 15/0189 |

* cited by examiner (a)

(b)

CONDUCTIVE ROLLER FOR ELECTROPHOTOGRAPHIC EQUIPMENT

CROSS-REFERENCE TO RELATED APPLICATIONS

This application is a continuation application of International Application number PCT/JP2018/031881 on Aug. 29, 2018, which claims the priority benefit of Japan Patent Application No. 2017-248643, filed on Dec. 26, 2017. The entirety of each of the above-mentioned patent applications is hereby incorporated by reference herein and made a part of this specification.

BACKGROUND

Technical Field

The present disclosure relates to a conductive roller for electrophotographic equipment.

Background Art

In electrophotographic equipment such as a copying machine, a printer, and a facsimile which use an electrophotographic method, conductive rollers such as a charging roller, a developing roller, a transfer roller, and a toner supply roller are disposed around a photosensitive drum. Regarding the conductive roller, those having a conductive elastic layer on the outer periphery of core metal are known. For example, Patent Literature 1 discloses a conductive roller having a conductive elastic layer containing a rubber containing halogen atoms on the outer periphery of a conductive support shaft.

PATENT LITERATURE

Patent Literature 1

Japanese Patent No. 4662542

In conductive rollers, core metal may be generally made of any material having conductivity. In this regard, the material is not limited. However, in consideration of costs, processability, and the like, those using iron or stainless steel as a base material are used in many cases. However, when halogen atoms are contained in the conductive elastic layer, there is a problem of rust being generated in the core metal using iron or stainless steel as a base material. It is also conceivable that the generation of rust be reduced by performing plating on the base material of the core metal. However, costs increase when the plating is made thicker in order to obtain stable rust resistance. In addition, when the plating is NI plating, pinhole defects are likely to occur, and it is difficult to reduce rust in the defects.

In Patent Literature 1, a conductive elastic layer containing halogen atoms is adhered to the outer periphery of a conductive support shaft using a conductive adhesive containing a phenolic resin, an epoxy resin, and a conducting agent. However, in this configuration, the generation of rust on the core metal using iron or stainless steel as a base material is not sufficiently reduced.

The present disclosure provides a conductive roller for electrophotographic equipment having excellent rust resistance in a shaft made of core metal.

SUMMARY OF DISCLOSURE

A conductive roller according to the present disclosure for electrophotographic equipment includes a shaft made of core metal, a protective layer formed on the outer periphery of the shaft, and a conductive rubber elastic layer formed on the outer periphery of the protective layer, wherein the conductive rubber elastic layer contains a rubber containing halogen atoms, and the protective layer is formed of a crosslinked material of a composition containing a material obtained by melting and mixing the following components (a) to (c):
(a) a polyfunctional maleimide compound having two or more maleimide groups;
(b) a benzoxazine compound; and
(c) an epoxy resin Preferably, the composition further contains (d) silica particles. Preferably, the primary particle size of the component (d) is in a range of 5 to 30 nm. Preferably, the content of the component (d) is in a range of 50 to 100 parts by mass with respect to 100 parts by mass of the components (a) to (c) in total. Preferably, the component (c) contains a trifunctional epoxy resin. Preferably, an adhesive layer containing a phenolic resin is provided between the protective layer and the conductive rubber elastic layer. Preferably, the adhesive layer contains an electron conducting agent. Preferably, the protective layer contains an electron conducting agent. Preferably, the content of the electron conducting agent in the protective layer is in a range of 7.5 to 15 parts by mass with respect to 100 parts by mass of the components (a) to (c) in total.

BRIEF DESCRIPTION OF DRAWINGS (a) of FIG. 1 is a perspective view of an appearance of a conductive roller for electrophotographic equipment according to an embodiment of the present disclosure, and (b) of FIG. 1 is a cross-sectional view taken along the line A-A.

Figure 2:
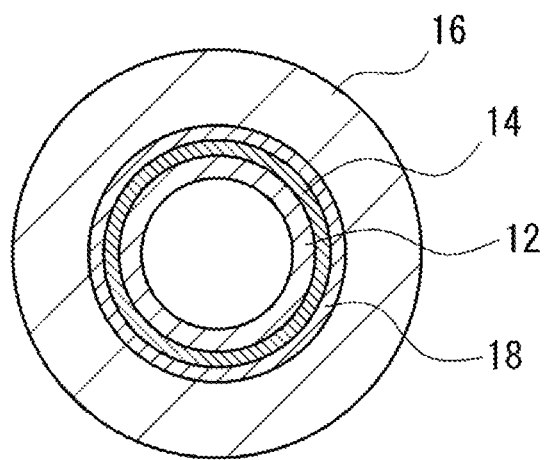

FIG. 2 is a cross-sectional view of a conductive roller for electrophotographic equipment in the radial direction according to another embodiment of the present disclosure.

DESCRIPTION OF EMBODIMENTS

In the conductive roller according to the present disclosure for electrophotographic equipment, since a protective layer formed of a crosslinked material of a composition containing a material obtained by melting and mixing the components (a) to (c) is provided on the outer periphery of the shaft made of core metal, the generation of rust on the shaft can be reduced according to halogen atoms contained in the conductive rubber elastic layer.

When the composition further contains (d) silica particles, barrier properties of the protective layer are improved, and rust resistance in the shaft is improved. In addition, when the primary particle size of the component (d) is in a range of 5 to 30 nm, barrier properties of the protective layer are improved, and rust resistance in the shaft is improved. In addition, when the content of the component (d) is in a range of 50 to 100 parts by mass with respect to 100 parts by mass of the components (a) to (c) in total, a balance between adhesion of the protective layer to the shaft and an effect of improving rust resistance in the shaft is excellent.

In addition, when the component (c) contains a trifunctional epoxy resin, heat resistance of the protective layer is improved. Therefore, it is possible to form an adhesive layer containing a phenolic resin. In addition, when an adhesive layer containing a phenolic resin is provided between the protective layer and the conductive rubber elastic layer, adhesion between the shaft and the conductive rubber elastic layer is improved.

In addition, when the adhesive layer contains an electron conducting agent, adhesion between the shaft and the conductive rubber elastic layer is improved. In addition, when the protective layer contains an electron conducting agent, adhesion between the shaft and the conductive rubber elastic layer is improved.

Embodiments of the present disclosure will be described below in detail with reference to the drawings.

(a) of FIG. 1 is a perspective view of an appearance of a conductive roller for electrophotographic equipment according to an embodiment of the present disclosure, and (b) of FIG. 1 is a cross-sectional view in the radial direction (cross-sectional view taken along the line A-A).

As shown in FIG. 1, a conductive roller for electrophotographic equipment (hereinafter simply referred to as a conductive roller 10) according to an embodiment of the present disclosure includes a shaft 12 made of core metal, a protective layer 14 formed on the outer periphery of the shaft 12, and a conductive rubber elastic layer 16 formed on the outer periphery of the protective layer 14. In the conductive roller 10, the protective layer 14 is in contact with both the shaft 12 and the conductive rubber elastic layer 16.

The shaft 12 may generally have conductivity, and in this regard, the material thereof is not limited. However, in consideration of costs and processability, in the present disclosure, those using iron or stainless steel as a base material are used. A configuration in which the shaft 12 is made of only a base material, or a configuration in which one, two, or more metal layers formed by plating or the like are provided on the surface of a base material may be used. The metal layer in this case is formed in order to increase rust resistance and improve adhesion to the protective layer 14. In consideration of costs, the shaft 12 is preferably made of only a base material. However, in order to obtain excellent rust resistance and excellent adhesion to the protective layer 14, the shaft 12 preferably has a configuration in which one, two, or more metal layers are provided on the surface of a base material.

The metal layer formed on the surface of the base material is made of a metal having conductivity. Examples of the metal for such a metal layer include nickel. In addition, in consideration of workability, adhesion, and the like, the metal layer formed on the surface of the base material is preferably formed by plating. The plating includes electroless plating and electrolytic plating. Electroless plating is preferable in consideration of excellent uniformity of the film thickness, having few pinhole defects and the like.

The thickness of the metal layer formed on the surface of the base material is preferably relatively thick (specifically 10 µm or more) in consideration of excellent rust resistance, excellent adhesion to the protective layer 14, and the like, but this increases costs accordingly, and thus the thickness is preferably 3 µm or less in consideration of costs.

The shape of the shaft 12 is not particularly limited as long as it allows the shaft 12 to be formed, and it may be a round bar shape made as a solid component or a cylindrical shape in which the inside is hollow.

The conductive rubber elastic layer 16 contains a rubber containing halogen atoms. The rubber containing halogen atoms is preferably included as a main component of the conductive rubber elastic layer 16. Examples of the rubber containing halogen atoms include epichlorohydrin rubber, chloroprene rubber, chlorinated butyl rubber, and chlorosulfonated polyethylene rubber. The conductive rubber elastic layer 16 can contain a conducting agent (an electron conducting agent and an ion conducting agent) for improving conductivity in addition to the rubber component. In addition, in addition to the rubber component, one, two, or more of additives such as an extending agent, a reinforcing agent, a processing aid, an antioxidant, a plasticizer, a UV absorber, and a lubricant can be contained.

Examples of the electron conducting agent include carbon black, graphite, potassium titanate, iron oxide, a conductive titanium oxide, a conductive zinc oxide, and a conductive tin oxide. Examples of the ion conducting agent include quaternary ammonium salts, borates, and surfactants.

The thickness of the conductive rubber elastic layer 16 is not particularly limited, and it is generally formed to be about 0.1 to 10 mm, and preferably 1 to 5 mm. The volume specific resistivity of the conductive rubber elastic layer 16 is preferably in a range of $1.0 \times 10^5$ to $5.0 \times 10^8$ Ω·cm in consideration of excellent conductivity and the like. The conductive rubber elastic layer 16 may be a solid non-foamed article or a sponge foamed article.

The protective layer 14 covers the outer peripheral surface of the shaft 12 made of core metal, and protects (prevents) contact of water, oxygen, halogen ions, hydrogen ions and the like with the outer peripheral surface of the shaft 12. In addition, it also has a function of adhering the shaft 12 and the conductive rubber elastic layer 16. The protective layer 14 is formed of a crosslinked material of a composition containing a material obtained by melting and mixing the following components (a) to (c).

(a) polyfunctional maleimide compound having two or more maleimide groups
(b) benzoxazine compound
(c) epoxy resin The polyfunctional maleimide compound used in the present disclosure is a compound having two or more maleimide groups, and can be represented by the following General Formula (1).

[Chem. 1]

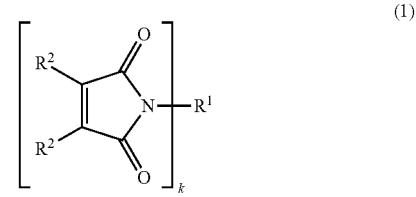

In Formula (1), $R^1$ represents a k-valent organic group, and $R^2$ and $R^3$ represent a hydrogen atom or a monovalent organic group. The organic group may be a hydrocarbon group including only C and H or a group including a hetero atom such as N, O, and S or a halogen atom in addition to C and H. k is an integer of 2 or more, and preferably an integer of 2 to 10. $R^2$ and $R^3$ may be the same group or different groups.

In Formula (1), examples of $R^1$ include an alkylene group and an arylene group. Examples of the alkylene group include those having 1 to 20 carbon atoms. Examples of the alkylene group include a chain alkylene group and a cyclic alkylene group. The chain alkylene group may be linear or branched. Examples of the chain alkylene group include a methylene group, an ethylene group, and a hexamethylene group. Examples of the arylene group include those having 1 to 20 carbon atoms. Examples of the arylene group include a phenylene group and a methylphenylene group.

In Formula (1), examples of the organic group for $R^2$ and $R^3$ include an alkyl group or aryl group having 1 to 20 carbon atoms. Examples of the alkyl group include a methyl group, an ethyl group, and a propyl group. Examples of the aryl group include a phenyl group, a substituted phenyl group, a naphthyl group, and a substituted naphthyl group.

Examples of such a polyfunctional maleimide compound include N,N'-ethylenebismaleimide, N,N'-hexamethylenebismaleimide, N,N'-(1,3-phenylene)bismaleimide, N,N'-[1,3-(2-methylphenylene)]bismaleimide, N,N'-(1,4-phenylene)bismaleimide, bis(4-maleimidophenyl)methane, bis(3-methyl-4-maleimidophenyl)methane, bis(4-maleimidophenyl)ether, bis(4-maleimidophenyl)sulfone, bis(4-maleimidophenyl)sulfide, bis(4-maleimidophenyl)ketone, bis(4-maleimidocyclohexyl)methane, 1,4-bis(4-maleimidophenyl)cyclohexane, 1,4-bis(4-maleimidomethyl)cyclohexane, 1,4-bis(maleimidomethyl)benzene, 1,3-bis(3-maleimidophenoxy)benzene, bis[4-(4-maleimidophenoxy)phenyl]methane, 1,1-bis[4-(3-maleimidophenoxy)phenyl]ethane, 1,1-bis[4-(4-maleimidophenoxy)phenyl]ethane, 1,2-bis[4-(3-maleimidophenoxy)phenyl]ethane, 1,2-bis[4-(4-maleimidophenoxy)phenyl]ethane, 2,2-bis[4-(4-maleimidophenoxy)phenyl]propane, 2,2-bis[4-(3-maleimidophenoxy)phenyl]butane, 2,2-bis[4-(3-maleimidophenoxy)phenyl]butane, 2,2-bis[4-(3-maleimidophenoxy)phenyl]-1,1,1,3,3,3 hexafluoropropane, 2,2-bis[4-(4-maleimidophenoxy)phenyl]-1,1,1,3,3,3hexaxafluoropropane, 4,4'-bis(3-maleimidophenoxy)phenyl,4,4'-bis(4-maleimidophenoxy)phenyl, bis[4-(3-maleimidophenoxy)phenyl]ketone, bis[4-(4-maleimidophenoxy)phenyl]ketone, bis[4-(3-maleimidophenoxy)phenyl]sulfide, bis[4-(4-maleimidophenoxy)phenyl]sulfide, bis[4-(3-maleimidophenoxy)phenyl]sulfoxide, bis[4-(4-(maleimidophenoxy)phenyl]sulfoxide, bis[4-(3-maleimidophenoxy)phenyl]sulfone, bis[4-(4-maleimidophenoxy)phenyl]sulfone, bis[4-(3-maleimidophenoxy)phenyl]ether, bis[4-(4-maleimidophenoxy)phenyl]ether, 1,4-bis[4-(4-maleimidophenoxy)-α,α-dimethylbenzene]benzene, 1,3-bis[4-(4-maleimidophenoxy)-α,α-dimethylbenzene]benzene, 1,4-bis[4-(3-maleimidophenoxy)-α,α-dimethylbenzene]benzene, 1,3-bis[4-(3-maleimidophenoxy)-α,α-dimethylbenzene]benzene, 1,4-bis[4-(4-maleimidophenoxy)-3,5-dimethyl-α,α-dimethylbenzene]benzene, 1,3-bis[4-(4-maleimidophenoxy)-3,5-dimethyl-α,α-dimethylbenzene]benzene, 1,4-bis[4-(3-maleimidophenoxy)-3,5-dimethyl-α,α-dimethylbenzene]benzene, and 1,3-bis[4-(3-maleimidophenoxy)-3,5-dimethyl-α,α-dimethylbenzene]benzene.

In addition, examples of the polyfunctional maleimide compound include not only the above non-polymers but also polymers shown in the following General Formulae (2) and (3).

[Chem. 2]

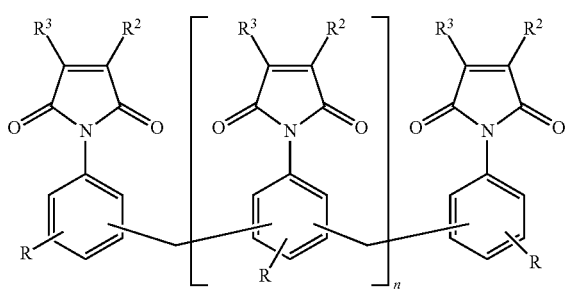

(2)

[Chem. 3]

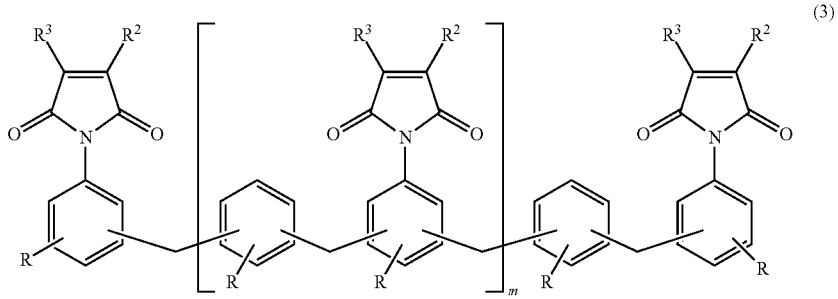

(3)

In Formulae (2) and (3), n and m represent the number of repeating units, and average values thereof are 0 to 10. In Formulae (2) and (3), the methylene group is a group bonded at the 2-position or 3-position of an aromatic ring, and R is a substituent of which one, two or more are bonded at arbitrary positions at which no methylene group is bonded. Examples of R include an alkyl group or aryl group having 1 to 20 carbon atoms.

The benzoxazine compound used in the present disclosure is a compound having a benzoxazine ring in the molecule. The benzoxazine compound is not particularly limited, and is preferably a compound having two or more benzoxazine rings in one molecule in consideration of crosslinkability, curability, and the like of the protective layer 14. Specific examples of the benzoxazine compound include, for example, an Fa type benzoxazine compound obtained by the reaction of a bisphenol compound such as a bisphenol A type benzoxazine compound and a bisphenol F type benzoxazine compound, an amine compound (for example, aniline), and formaldehyde, and a Pd type benzoxazine compound obtained by the reaction of a phenyl diamine compound such as a diaminodiphenylmethane type benzoxazine compound, a phenol compound, and formaldehyde. Regarding these compounds, commercially available products can be used. These are non-polymers. Between the Fa type benzoxazine compound and the Pd type benzoxazine compound, the Pd type benzoxazine compound is preferable because it has superior heat resistance.

For example, the bisphenol F type benzoxazine compound as a Fa type benzoxazine compound has a structure represented by the following Formula (4). This is obtained by the reaction of bisphenol F, aniline, and formaldehyde.

[Chem. 4]

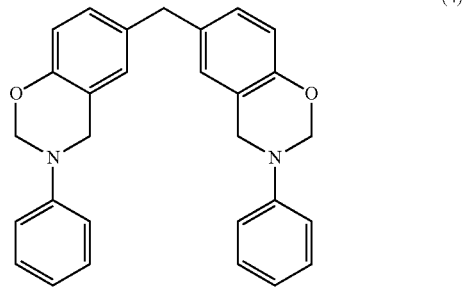

(4)

For example, the Pd type benzoxazine compound has a structure represented by the following Formula (5). This is obtained by the reaction of 4,4'-methylenedianiline, phenol, and formaldehyde.

[Chem. 5]

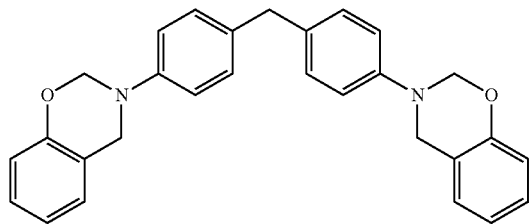

(5)

The epoxy resin used in the present disclosure can improve adhesion of the protective layer 14 to the shaft 12 made of a metal. The epoxy resin used in the present disclosure is not particularly limited, and examples thereof include a bisphenol type epoxy resin, a novolac type epoxy resin, an alicyclic epoxy resin, glycidyl esters, glycidyl amines, a heterocyclic epoxy resin, and a brominated epoxy resin. Examples of the bisphenol type epoxy resin include a bisphenol A type epoxy resin, a bisphenol F type epoxy resin, and a bisphenol S type epoxy resin. Examples of the novolac type epoxy resin include a phenol novolac type epoxy resin, a cresol novolac type epoxy resin, a bisphenol A novolac type epoxy resin, and a dicyclopentadiene novolac type epoxy resin. Examples of the alicyclic epoxy resin include 3,4-epoxy-6-methylcyclohexylmethyl-3,4-epoxy-6-methylcyclohexanecarboxylate, 3,4-epoxycyclohexylmethyl-3,4-epoxycyclohexancarpoxylate, and 1-epoxy ethyl-3,4-epoxycyclohexane. Examples of the glycidyl esters include phthalic acid diglycidyl ester, tetrahydrophthalic acid diglycidyl ester, and dimer acid glycidyl ester. Examples of the glycidyl amines include tetraglycidyl diaminodiphenylmethane, triglycidyl P-aminophenol, and N,N-diglycidylaniline. Examples of the heterocyclic epoxy resin include 1,3-diglycidyl-5,5-dimethylhydantoin, and triglycidyl isocyanurate. Examples of the brominated epoxy resin include a tetrabromo bisphenol A type epoxy resin, a tetrabromo bisphenol F type epoxy resin, a brominated cresol novolac type epoxy resin, and a brominated phenol novolac type epoxy resin.

The epoxy resin used in the present disclosure preferably includes a trifunctional epoxy resin. Accordingly, since a degree of crosslinking increases, the heat resistance of the protective layer 14 is improved. Then, an adhesive layer containing a phenolic resin can be formed. The epoxy resin used in the present disclosure may include only a trifunctional epoxy resin or include a trifunctional epoxy resin and a bifunctional or monofunctional epoxy resin in combination.

The protective layer 14 may contain silica particles, a conducting agent, and the like as necessary. In addition, a leveling agent, an antioxidant, a processing agent, a stabilizer and the like may be contained.

In consideration of dispersibility, uniformity, and the like, the silica particles (d) are preferably nanoparticles having a nano order size. More specifically, particles having a primary particle size in a range of 5 to 30 nm are preferable. In the protective layer 14, the content of silica particles (d) is preferably in a range of 50 to 100 parts by mass with respect to 100 parts by mass of the components (a) to (c) in total. The content is more preferably in a range of 50 to 80 parts by mass.

Examples of the conducting agent include an electron conducting agent and an ion conducting agent. Examples of the electron conducting agent include carbon black, graphite, potassium titanate, iron oxide, a conductive titanium oxide, a conductive zinc oxide, and a conductive tin oxide. Examples of the ion conducting agent include quaternary ammonium salts, borates, and surfactants. In the protective layer 14, the content of the electron conducting agent is preferably in a range of 7.5 to 15 parts by mass with respect to 100 parts by mass of the components (a) to (c) in total.

The protective layer 14 can be formed using a composition for forming a protective layer. The composition for forming a protective layer contains a material obtained by melting and mixing the components (a) to (c) and a low boiling point solvent in which the material obtained by melting and mixing the components (a) to (c) is dissolved. Examples of the low boiling point solvent include methyl ethyl ketone (MEK), methyl isobutyl ketone (MIBK), and cyclohexane. The composition for forming a protective layer may contain the above silica particles, the above conducting agent, a leveling agent, an antioxidant, a processing agent, a curing accelerator, a stabilizer and the like as necessary.

Examples of the curing accelerator include imidazoles such as 2-methylimidazole, 2-ethyl-4-methylimidazole, and 2-heptaimidazole; amines such as triethanolamine, triethylenediamine, and N-methylmorpholine; organic phosphines such as triphenyl phosphine and tritolyl phosphine; tetraphenylphosphonium salts such as tetraphenylphosphonium tetraphenyl borate, and triethylammonium tetraphenyl borate; 1,8-diazabicyclo[5.4.0]undecene-7 and derivatives thereof; and organic metal salts such as lead naphthenate, lead stearate, zinc naphthenate, tin oleate, manganese naphthenate, cobalt naphthenate, and cobalt octylate. These curing accelerators may be used alone or two or more thereof may be used in combination. In addition, as necessary, an organic peroxide, an azo compound, and the like can be used in combination.

The composition for forming a protective layer can be prepared as follows. First, the components (a) to (c) are melted and mixed. Melting and mixing of the components (a) to (c) can be performed by adding at least the components (a) to (c) and heating and mixing them. In this case, as necessary, the above silica particles, the above conducting agent, a leveling agent, an antioxidant, a processing agent, a stabilizer, and the like may be added, heated and mixed together. However, the curing accelerator is not added during the melting and mixing. This is to prevent a crosslinking reaction of the polyfunctional maleimide compound and the epoxy resin from occurring.

The heating temperature during melting and mixing may be a temperature or higher at which the mixture of the components (a) to (c) melts. For example, the heating temperature can be a temperature of 100° C. or higher. In addition, the heating temperature can be a temperature of 150° C. or higher. In addition, the heating temperature is preferably 400° C. or lower, and more preferably, 200° C. or lower. A heating and mixing time is not particularly limited, and may be about 0.1 to 10 minutes after the mixture of the components (a) to (c) has melted. Examples of a heating and mixing device include mixers such as a kneader and a twin-screw extruder. After a state in which the components (a) to (c) are melted and mixed is formed, for example, the mixture is naturally cooled under an environment at 5 to 100° C., or for example, forcibly cooled using a refrigerant at −20 to 80° C., and thereby a solid material is obtained. The solid material can be ground using a grinder and stored in a dry state.

Next, the material obtained by melting and mixing the components (a) to (c) is dissolved in the low boiling point solvent. In this case, heating may be performed at a predetermined temperature or dissolving may be performed at normal temperature. When heating is performed during dissolving, the heating temperature is a temperature lower than the boiling point of the low boiling point solvent, and is preferably 100° C. or lower. The heating temperature is more preferably 80° C. or lower. A material obtained by melting and mixing the components (a) to (c) is dissolved in the low boiling point solvent, and the curing accelerator is then added to the solution. Thereby, a composition for forming a protective layer can be prepared.

Generally, the polyfunctional maleimide compound (a) has poor solubility in a general-purpose organic solvent with a low boiling point. However, as in the present disclosure, when the components (a) to (c) are melted and mixed, the obtained material can be dissolved in the low boiling point solvent. This is inferred to be caused by the fact that, when the components (a) to (c) are melted and mixed, the components (a) and (b) react with each other and change to a compound having high solubility. In the component (b), a ring opening reaction occurs due to heating, and molecules having a phenol group are formed. The phenol group generated in this manner reacts with an unsaturated bond of the component (a) to form a bond. The compound obtained in this manner is inferred to be highly soluble. The obtained material is an uncrosslinked material due to its solubility.

In this manner, when the components (a) to (c) are melted and mixed, the obtained material can be dissolved in a general-purpose organic solvent with a low boiling point. In addition, thereby, a uniform coating solution as a precursor for forming the protective layer 14 can be formed, and since precipitation of the component (a) having low solubility is reduced in the coating solution, the protective layer 14 formed thereby has improved barrier properties. In addition, the component (b) forms a phenol group due to heating, and functions as a crosslinking agent for the component (c), but the components (a) to (c) are melted and mixed to form a bond with the component (a). Therefore, in the protective layer 14 after curing, an interpenetrating polymer network (IPN structure) of an epoxy resin and a bismaleimide resin is formed. Accordingly, since chemical stability of the protective layer 14 is improved, barrier properties are improved. In this manner, compared to a film including only an epoxy resin, a film including only a phenolic resin, and an epoxy resin film using a phenolic resin as a crosslinking agent, barrier properties are improved and an effect of protecting (preventing) contact of water, oxygen, halogen ions, hydrogen ions, and the like with the outer peripheral surface of the shaft 12 is excellent.

The amount of the component (a) added is not particularly limited, and is preferably in a range of 50 to 90 parts by mass with respect to 100 parts by mass of the components (a), (b), and (c) in total. The amount is more preferably in a range of 50 to 80 parts by mass, and most preferably in a range of 55 to 75 parts by mass. In addition, the amount of the component (b) added is not particularly limited, and is preferably in a range of 10 to 40 parts by mass with respect to 100 parts by mass of the components (a), (b), and (c) in total. The amount is more preferably in a range of 10 to 30 parts by mass, and most preferably in a range of 10 to 25 parts by mass. In addition, the amount of the component (c) added is not particularly limited, and is preferably in a range of 1.0 to 30 parts by mass with respect to 100 parts by mass of the components (a), (b), and (c) in total. The amount is more preferably in a range of 5.0 to 30 parts by mass, and most preferably in a range of 10 to 30 parts by mass.

The conductive roller 10 can be produced by forming the protective layer 14 on the outer periphery of the shaft 12 and forming the conductive rubber elastic layer 16 on the outer periphery of the protective layer 14.

The protective layer 14 can be formed by performing a predetermined heat treatment after applying the composition for forming a protective layer to the outer periphery of the shaft 12. Regarding the heat treatment when the protective layer 14 is formed, heating is performed at a temperature at which the material obtained by melting and mixing the components (a) to (c) is crosslinked, that is, at a temperature at which both an epoxy resin and a bismaleimide resin are crosslinked. The low boiling point solvent is distilled off from a coating film before the crosslinking reaction occurs. The heating temperature in the heat treatment is preferably 150 to 250° C. In addition, the heating time is preferably 30 to 60 minutes.

The conductive rubber elastic layer 16 can be formed by molding a conductive rubber composition for forming the conductive rubber elastic layer 16 into a layer. The conductive rubber composition can be molded by extrusion and molding or shaping. The conductive rubber composition is crosslinked and cured due to heating during extrusion and molding or shaping.

The conductive rubber composition contains the rubber containing halogen atoms. In addition, as necessary, one, two or more of additives such as a crosslinking agent, a crosslinking aid, a crosslinking accelerator, the above conducting agent (an electron conducting agent and an ion conducting agent), an extending agent, a reinforcing agent, a processing aid, an antioxidant, a plasticizer, a UV absorber, and a lubricant can be contained. The conductive rubber composition can be prepared by kneading them.

According to the conductive roller 10 having the above configuration, when the protective layer 14 formed of a crosslinked material of a composition containing a material obtained by melting and mixing the components (a) to (c) is provided on the outer periphery of the shaft 12 made of core metal, adhesion between the shaft 12 and the protective layer 14 is improved according to the epoxy resin, and chemical stability is improved according to the IPN structure of the epoxy resin and the bismaleimide resin. Therefore, the generation of rust on the shaft 12 can be reduced according to halogen atoms contained in the conductive rubber elastic layer 16.

In addition, when the composition containing a material obtained by melting and mixing the components (a) to (c) further contains (d) silica particles, barrier properties of the protective layer 14 are improved, and rust resistance in the shaft 12 is improved. In this case, when the primary particle size of the component (d) is in a range of 5 to 30 nm, barrier properties of the protective layer 14 are improved, and rust resistance in the shaft 12 is improved. In addition, when the content of the component (d) is in a range of 50 to 100 parts by mass with respect to 100 parts by mass of the components (a) to (c) in total, a balance between adhesion of the protective layer 14 to the shaft 12 and an effect of improving rust resistance in the shaft 12 is excellent. In addition, when the protective layer 14 contains an electron conducting agent, adhesion between the shaft 12 and the conductive rubber elastic layer 16 is improved.

The conductive roller 10 includes the shaft 12, the protective layer 14 formed on the outer periphery of the shaft 12, and the conductive rubber elastic layer 16 formed on the outer periphery of the protective layer 14. However, the conductive roller according to the present disclosure for electrophotographic equipment is not limited to this configuration. For example, an adhesive layer may be provided between the protective layer 14 and the conductive rubber elastic layer 16.

FIG. 2 is a cross-sectional view of a conductive roller for electrophotographic equipment in the radial direction according to another embodiment of the present disclosure.

As shown in FIG. 2, a conductive roller for electrophotographic equipment according to another embodiment of the present disclosure (hereinafter simply referred to as a conductive roller 20) includes a shaft 12 made of core metal, a protective layer 14 formed on the outer periphery of the shaft 12, an adhesive layer 18 formed on the outer periphery of the protective layer 14, and a conductive rubber elastic layer 16 formed on the outer periphery of the adhesive layer 18. In the conductive roller 20, the protective layer 14 is in contact with both the shaft 12 and the adhesive layer 18. The adhesive layer 18 is in contact with both the protective layer 14 and the conductive rubber elastic layer 16.

The conductive roller 20 is different from the conductive roller 10 only in the presence or absence of the adhesive layer 18, and is otherwise the same as the conductive roller 10, and descriptions thereof will be omitted.

The adhesive layer 18 allows the protective layer 14 and the conductive rubber elastic layer 16 to adhere. The adhesive layer 18 can be formed using an adhesive composition containing an adhesive component. More specifically, an adhesive composition is applied to the outer periphery of the protective layer 14 formed on the outer periphery of the shaft 12, and drying, curing, and crosslinking treatments are then performed as necessary, and thereby the adhesive layer 18 can be formed on the outer periphery of the protective layer 14. In this case, in the conductive rubber elastic layer 16, on the outer periphery of the adhesive layer 18, or the outer periphery of the adhesive composition applied to the outer periphery of the protective layer 14, a conductive rubber composition is molded.

Examples of the adhesive component of the adhesive composition include a phenolic resin adhesive, an epoxy resin adhesive, a nitrile rubber adhesive, an acrylic resin adhesive, a polyurethane adhesive, a styrene-butadiene adhesive, and a natural rubber adhesive. One of the adhesive components may be used alone or two or more thereof may be used in combination.

The adhesive component of the adhesive composition is preferably a vulcanization adhesive because it is cured due to heat or pressure during vulcanization of the conductive rubber elastic layer 16 and can function as the adhesive layer 18. Examples of the vulcanization adhesive include a phenolic resin adhesive, an epoxy resin adhesive, and a nitrile rubber adhesive among the adhesive components. Among these, a phenolic resin adhesive is preferable in consideration of adhesion between a rubber forming the conductive rubber elastic layer 16 and the protective layer 14.

A conducting agent for imparting conductivity (an electron conducting agent and an ion conducting agent) can be contained in the adhesive composition as necessary. Regarding the conducting agent, those described in the protective layer 14 may be exemplified. In addition, in the adhesive composition, as necessary, one, two or more of additives such as a vulcanizing agent (a crosslinking agent), a vulcanization accelerator, a vulcanization aid (a crosslinking aid), an extending agent, a reinforcing agent, a processing aid, an antioxidant, a plasticizer, a UV absorber, and a lubricant can be contained.

In consideration of coating properties, the viscosity of the adhesive composition can be adjusted using a solvent. Examples of the solvent include methyl ethyl ketone (MEK) and methyl isobutyl ketone (MIBK).

The thickness of the adhesive layer 18 is not particularly limited, but it is preferably 100 µm or less in consideration of a strong influence of the volume specific resistivity of the adhesive layer 18 and the like. The thickness is more preferably 10 µm or less. In addition, the thickness is preferably 1 µm or more in consideration of an excellent adhesive force and the like, and more preferably 5 µm or more. The volume specific resistivity of the adhesive layer 18 is not particularly limited, but it is preferably in a range of $1.0 \times 10^2$ to $5.0 \times 10^5$ $\Omega \cdot \text{cm}$ in consideration of excellent conductivity and the like.

According to the conductive roller 20 having the above configuration, the adhesive layer 18 is provided between the protective layer 14 and the conductive rubber elastic layer 16, and thus adhesion between the shaft 12 and the conductive rubber elastic layer 16 is improved. When the adhesive layer 18 contains a phenolic resin, its adhesion is particularly excellent. In addition, when the adhesive layer 18 contains an electron conducting agent, adhesion between the shaft 12 and the conductive rubber elastic layer 16 is improved.

In the conductive roller 10, the protective layer 14 is provided in contact with both the shaft 12 and the conductive rubber elastic layer 16. However, in the present disclosure, one or more layers other than the adhesive layer 18 may be provided between the shaft 12 and the protective layer 14, or between the protective layer 14 and the conductive rubber elastic layer 16 as long as adhesion is sufficiently secured. Similarly, in the conductive roller 20, one or more other layers may be provided between the shaft 12 and the protective layer 14, and between the protective layer 14 and the adhesive layer 18.

In addition, the conductive roller 10 includes the shaft 12, the protective layer 14, and one conductive rubber elastic layer 16. However, in the present disclosure, in order to adjust the resistance and prevent component migration, one or more other conductive rubber elastic layers may be provided between the protective layer 14 and the conductive rubber elastic layer 16 or on the outer periphery of the conductive rubber elastic layer 16. In addition, on the outer periphery of the conductive rubber elastic layer 16, in order to protect the surface and impart electrical characteristics and the like, a surface layer may be provided or a surface modification treatment may be performed on the surface of the conductive rubber elastic layer 16. Similarly, in the conductive roller 20, one or more other conductive rubber elastic layers may be provided between the adhesive layer 18 and the conductive rubber elastic layer 16 or on the outer periphery of the conductive rubber elastic layer 16. In addition, similarly, in the conductive roller 20, a surface layer may be provided on the outer periphery of the conductive rubber elastic layer 16, and a surface modification treatment may be performed on the surface of the conductive rubber elastic layer 16.

The main material of the surface layer is not particularly limited, and examples thereof include polyamide (nylon), acrylic, urethane, silicone, or fluorine polymers. These polymers may be modified. Examples of the modifying group include a N-methoxymethyl group, a silicone group, and a fluorine group.

In order to impart conductivity, a conducting agent known in the related art such as carbon black, a carbon nano tube, graphite, c-TiO$_2$, c-ZnO, c-SnO$_2$ (c-indicates conductivity), and an ion conducting agent (such as quaternary ammonium salts, borates, and surfactants) can be appropriately added to the surface layer. In addition, as necessary, various additives may be appropriately added.

Examples of the surface modification method include a method of emitting UV or an electron beam and a method of contacting with a surface modifier that can react with an unsaturated bond or a halogen in the conductive rubber elastic layer 16, for example, a compound having a reaction active group such as an isocyanate group, a hydrosilyl group, an amino group, a halogen group, and a thiol group.

The conductive roller according to the present disclosure can be used as a conductive roller such as a charging roller, a developing roller, a transfer roller, and a toner supply roller of electrophotographic equipment such as a copying machine, a printer, and a facsimile.

EXAMPLES

While the present disclosure will be described below in detail with reference to examples, the present disclosure is not limited to the configuration.

<Material for Forming Protective Layer>

HR3070: commercially available from Printec Corporation, uncrosslinked powder containing a mixture in which the components (a) to (c) were melted HR3032: commercially available from Printec Corporation, uncrosslinked powder containing a mixture in which the components (a) to (c) were melted HR3053: commercially available from Printec Corporation, uncrosslinked powder containing a mixture in which the components (a) to (c) were melted HR3040: commercially available from Printec Corporation, uncrosslinked powder containing a mixture (not heated or kneaded) of the components (a) to (c)

VG3101L: commercially available from Printec Corporation, trifunctional epoxy resin Colloidal silica: "MEK-ST-40" commercially available from Nissan Chemical Corporation, solid content concentration of 40 mass %, primary particle size of 10 to 15 nm, dispersion medium: MEK Carbon black dispersion solution: "#273" commercially available from Mikuni-Color Ltd., solid content concentration of 17 mass %, average particle size d50:0.2 μm, dispersion medium: MEK <Material for Forming Adhesive Layer>

Phenolic adhesive: "Metaloc U-20" commercially available from Toyo Science Co., Ltd., containing a conducting agent, solid content concentration of 18 to 22 mass %, dispersion medium: MEKI <Preparation of Conductive Rubber Composition>

100 parts by mass of epichlorohydrin rubber (ECO) ["HydrnT3106" commercially available from Zeon Corporation], 0.5 parts by mass of sulfur [commercially available from Tsurumi Chemical Industry Co., Ltd.] as a vulcanizing agent, 5.0 parts by mass of two types of zinc oxide [commercially available from Mitsu Mining & Smelting Co., Ltd.] as a vulcanization aid, 10.0 parts by mass of hydrotalcite [product name "DHT4A" commercially available from Kyowas Chemical Industry Co., Ltd.], 1.0 part by mass of a vulcanization accelerator A [product name "Sunceller CZ" commercially available from Sanshin Chemical Industry Co., Ltd.], 1.0 part by mass of a vulcanization accelerator B [product name "Accel TBT" commercially available from Ouchi Shinko Chemical Industrial Co., Ltd.], and 1.0 part by mass of tributylethyl ammonium-sulfovinate (quaternary ammonium salt) as an ion conducting agent were kneaded in a kneader to obtain a conductive rubber composition.

Example 1

<Preparation of Composition for Forming Protective Layer>

HR3070 was dissolved in MEK so that a solid content concentration was 30 mass %, and thereby a composition for forming a protective layer was prepared.

<Production of Conductive Roller>

The composition for forming a protective layer was applied to the outer periphery of core metal (shaft) in which 3 μm nickel plating was performed on an iron base material (φ8 mm) and sufficiently dried, and the coating film was then heated and cured (crosslinked) at a predetermined temperature, and thereby a protective layer (10 μm) was formed on the outer periphery of the shaft. Next, the shaft on which the protective layer was formed was set in a pipe-shaped mold for molding, the conductive rubber composition was injected into the mold, and then heated at 180° C. for 30 minutes, and thereby the conductive rubber composition was vulcanized and cured, and a conductive rubber elastic layer (3 mm) was formed on the outer periphery of the protective layer. Thereby, a conductive roller was obtained.

Examples 2 and 3

Conductive rollers were obtained in the same manner as in Example 1 except that components shown in Table 1 were used in place of HR3070 in preparation of a composition for forming a protective layer.

Example 4

A conductive roller was obtained in the same manner as in Example 1 except that colloidal silica was additionally added in preparation of a composition for forming a protective layer.

Example 5

A conductive roller was obtained in the same manner as in Example 4 except that an adhesive layer was formed between a protective layer and a conductive rubber elastic layer in production of a conductive roller. Specifically, a material for forming an adhesive layer was applied to the outer periphery of the formed protective layer and sufficiently dried, the shaft was then set in a pipe-shaped mold for molding, a conductive rubber elastic layer was molded, an adhesive layer (8 μm) was formed on the outer periphery of the protective layer, and a conductive rubber elastic layer (3 mm) was formed on the outer periphery of the adhesive layer.

Example 6

A conductive roller was obtained in the same manner as in Example 5 except that a carbon black dispersion solution was additionally added in preparation of a composition for forming a protective layer.

Comparative Example 1

A conductive roller was obtained in the same manner as in Example 6 except that an epoxy resin (VG3101L) was directly used as a composition for forming a protective layer.

Comparative Example 2

A conductive roller was obtained in the same manner as in Example 6 except that HR3040 was used in place of HR3070 in preparation of a composition for forming a protective layer.

Comparative Example 3

<Preparation of Adhesive 1>

60 parts by mass of a novolac type phenolic resin, 20 parts by mass of a bisphenol A type epoxy resin, 20 parts by mass of carbon black, and 400 parts by mass of MEK were added and stirred at room temperature to prepare an adhesive 1.

<Production of Conductive Roller>

A conductive roller was produced in the same manner as in Example 1 except that the adhesive 1 was used in place of the composition for forming a protective layer.

Rust reduction and adhesion were evaluated using the produced conductive rollers. The evaluation methods were as follows. The results are shown in Table 1.

(Evaluation of Rust Reduction (Product Evaluation))

The produce conductive rollers were left in a moist heat tank (50° C.×95% RH), and after 30 days, it was visually checked the generation of rust on the shaft. When rust was not generated at all on the outer peripheral surface of the shaft, this was evaluated as very good "⊚." When rust was generated on 1 or 2 places on the outer peripheral surface of the shaft, this was evaluated as good "O." When rust was generated on 3 to 5 places on the outer peripheral surface of the shaft, this was evaluated as poor "Δ." When rust was generated on 6 or more places on the outer peripheral surface of the shaft, this was evaluated as very poor "x."

(Evaluation of Rust Reduction (Salt Water Spray Test))

In order to evaluate corrosion resistance of the protective layer, a sample in which only a protective layer was applied to core metal (shaft) in which 3 μm nickel plating was performed on an iron base material (φ8 mm) was prepared. This sample was subjected to a neutral salt water spray test according to JIS Z2731, and a rust generation state after 240 h was evaluated. When rust was not generated at all on the outer peripheral surface of the shaft, this was evaluated as very good "⊚." When dot-like rust was generated on 1 or 2 places on the outer peripheral surface of the shaft, this was evaluated as good "O." When dot-like rust was generated on 3 to 5 places on the outer peripheral surface of the shaft, this was evaluated as poor "Δ." When dot-like rust was generated on 6 or more places on the outer peripheral surface of the shaft, this was evaluated as very poor "x."

(Evaluation of Adhesion)

The produced conductive rollers were left in a moist heat tank (80° C.×90% RH), and after 30 days, an adhesion state between the shaft and the conductive rubber elastic layer was checked. When they were not adhered from the beginning, this was evaluated as very poor "x." When peeling off occurred within 30 days, this was evaluated as poor "Δ." When no peeling occurred after 30 days, but they were easily peeled off by hand, this was evaluated as good "O." When no peeling occurred after 30 days and they were not easily peeled off with hand, this was evaluated as very good "⊚."

TABLE 1

| | Melt and mix | Examples | | | | | | Comparative Examples | | |
|---|---|---|---|---|---|---|---|---|---|---|
| | | 1 | 2 | 3 | 4 | 5 | 6 | 1 | 2 | 3 |
| Material for forming protective layer | | | | | | | | | | |
| HR3070 | Yes | 100 | — | — | 100 | 100 | 100 | — | — | — |
| HR3032 | Yes | — | 100 | — | — | — | — | — | — | — |
| HR3053 | Yes | — | — | 100 | — | — | — | — | — | — |
| HR3040 | No | — | — | — | — | — | — | — | 100 | — |
| VG3101L (epoxy resin) | | — | — | — | — | — | — | 100 | — | — |
| Colloidal silica | | — | — | — | 50 | 50 | 50 | 50 | 50 | — |
| Carbon black dispersion solution | | — | — | — | — | — | 10 | 10 | 10 | — |

TABLE 1-continued

| Melt and mix | Examples | | | | | | Comparative Examples | | |
|---|---|---|---|---|---|---|---|---|---|
| | 1 | 2 | 3 | 4 | 5 | 6 | 1 | 2 | 3 |
| Material for forming adhesive layer | | | | | | | | | |
| Phenolic adhesive | — | — | — | — | Contained | Contained | Contained | Contained | — |
| Adhesive 1 (phenol/epoxy type) | — | — | — | — | — | — | — | — | Contained |
| Reduction of rust (salt water spray test) | ○ | ○ | ○ | ◎ | ◎ | ○ | Δ | Δ | Δ |
| Reduction of rust (product evaluation) | ○ | ○ | ○ | ◎ | ◎ | ◎ | Δ | X | ○ |
| Adhesion | ○ | ○ | ○ | ○ | ○ | ◎ | ○ | ○ | ○ |

In Comparative Example 1, since the protective layer containing an epoxy resin as an organic component and the adhesive layer containing a phenolic resin as an adhesive component were simply provided between the shaft made of core metal and the conductive rubber elastic layer containing halogen atoms, the adhesion was satisfactory, but the generation of rust was not sufficiently reduced. In Comparative Example 2, a composition containing the components (a) to (c) was used to form the protective layer, but the components (a) to (c) were not melted and mixed, and the adhesion was satisfactory, but the generation of rust was not sufficiently reduced. In Comparative Example 3, since a layer including the phenol/epoxy type adhesive 1 was simply formed between the shaft made of core metal and the conductive rubber elastic layer containing halogen atoms, the adhesion was satisfactory, but the generation of rust was not sufficiently reduced.

On the other hand, in the examples, a composition containing the components (a) to (c) was used to form the protective layer, and the components (a) to (c) were melted and mixed. Therefore, the adhesion and rust reduction both were satisfied in the results. In addition, comparing the examples, it was found that a rust reduction effect was improved when silica particles were added. In addition, it was found that the adhesion was improved when the electron conducting agent was added.

While embodiments of the present disclosure have been described above in detail, the present disclosure is not limited to the above examples, and various modifications can be made without departing from the spirit and scope of the present disclosure.

The invention claimed is:

1. A conductive roller for electrophotographic equipment comprising a shaft made of core metal, a protective layer formed on the outer periphery of the shaft, and a conductive rubber elastic layer formed on the outer periphery of the protective layer,
    wherein the conductive rubber elastic layer contains a rubber containing halogen atoms, and the protective layer is formed of a crosslinked material of a composition containing a material obtained by melting and mixing the following components (a) to (c):
    (a) a polyfunctional maleimide compound having two or more maleimide groups;
    (b) a benzoxazine compound; and
    (c) an epoxy resin.

2. The conductive roller for electrophotographic equipment according to claim 1,
    wherein the composition further contains (d) silica particles.

3. The conductive roller for electrophotographic equipment according to claim 2,
    wherein a primary particle size of the component (d) is in a range of 5 to 30 nm.

4. The conductive roller for electrophotographic equipment according to claim 2,
    wherein a content of the component (d) is in a range of 50 to 100 parts by mass with respect to 100 parts by mass of the components (a) to (c) in total.

5. The conductive roller for electrophotographic equipment according to claim 1,
    wherein the component (c) contains a trifunctional epoxy resin.

6. The conductive roller for electrophotographic equipment according to claim 1,
    wherein an adhesive layer containing a phenolic resin is provided between the protective layer and the conductive rubber elastic layer.

7. The conductive roller for electrophotographic equipment according to claim 6,
    wherein the adhesive layer contains an electron conducting agent.

8. The conductive roller for electrophotographic equipment according to claim 1,
    wherein the protective layer contains an electron conducting agent.

9. The conductive roller for electrophotographic equipment according to claim 8,
    wherein a content of the electron conducting agent in the protective layer is in a range of 7.5 to 15 parts by mass with respect to 100 parts by mass of the components (a) to (c) in total.

* * * * *